March 1, 1949. A. C. DE LORME ET AL 2,463,158
APPARATUS FOR BRAZING ARTICLES
Filed Jan. 12, 1946 4 Sheets-Sheet 3
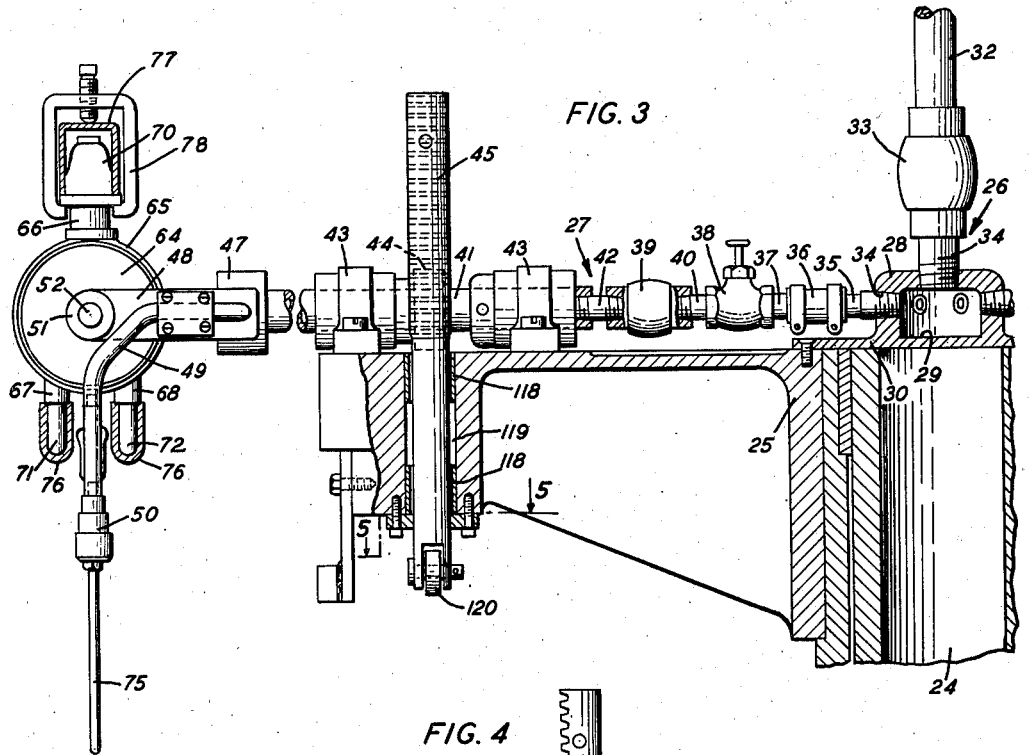
FIG. 3
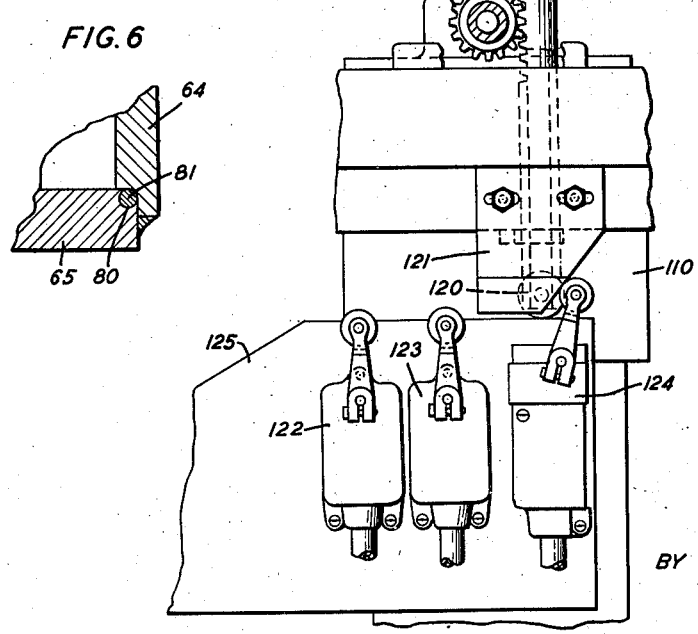
FIG. 4
FIG. 5
FIG. 6
INVENTORS
A.C. DeLORME
C.G. SCHESCH
BY
W. C. Parnell
ATTORNEY March 1, 1949. A. C. DE LORME ET AL 2,463,158
APPARATUS FOR BRAZING ARTICLES
Filed Jan. 12, 1946 4 Sheets-Sheet 4
FIG.7
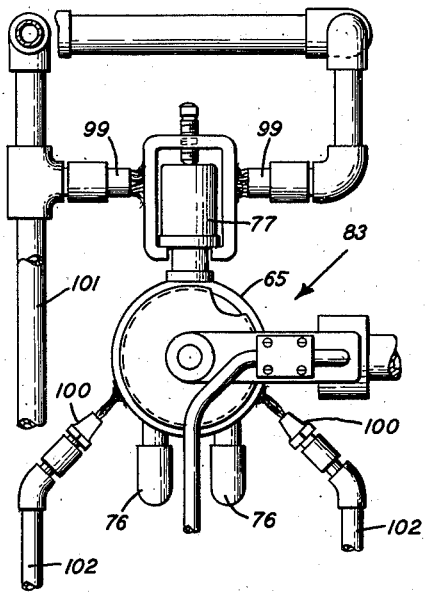
FIG.8
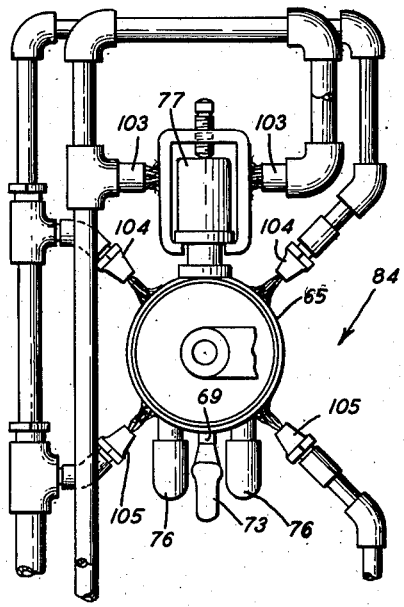
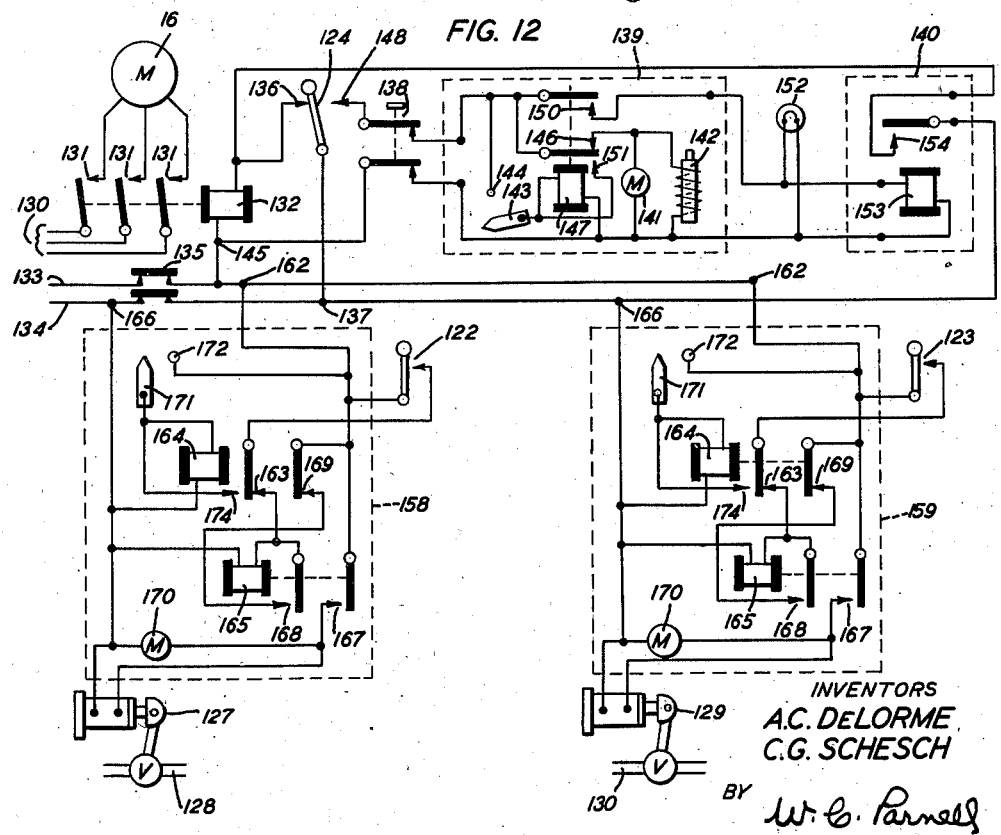
INVENTORS
A.C. DELORME
C.G. SCHESCH
BY
W. C. Parnell
ATTORNEY Patented Mar. 1, 1949

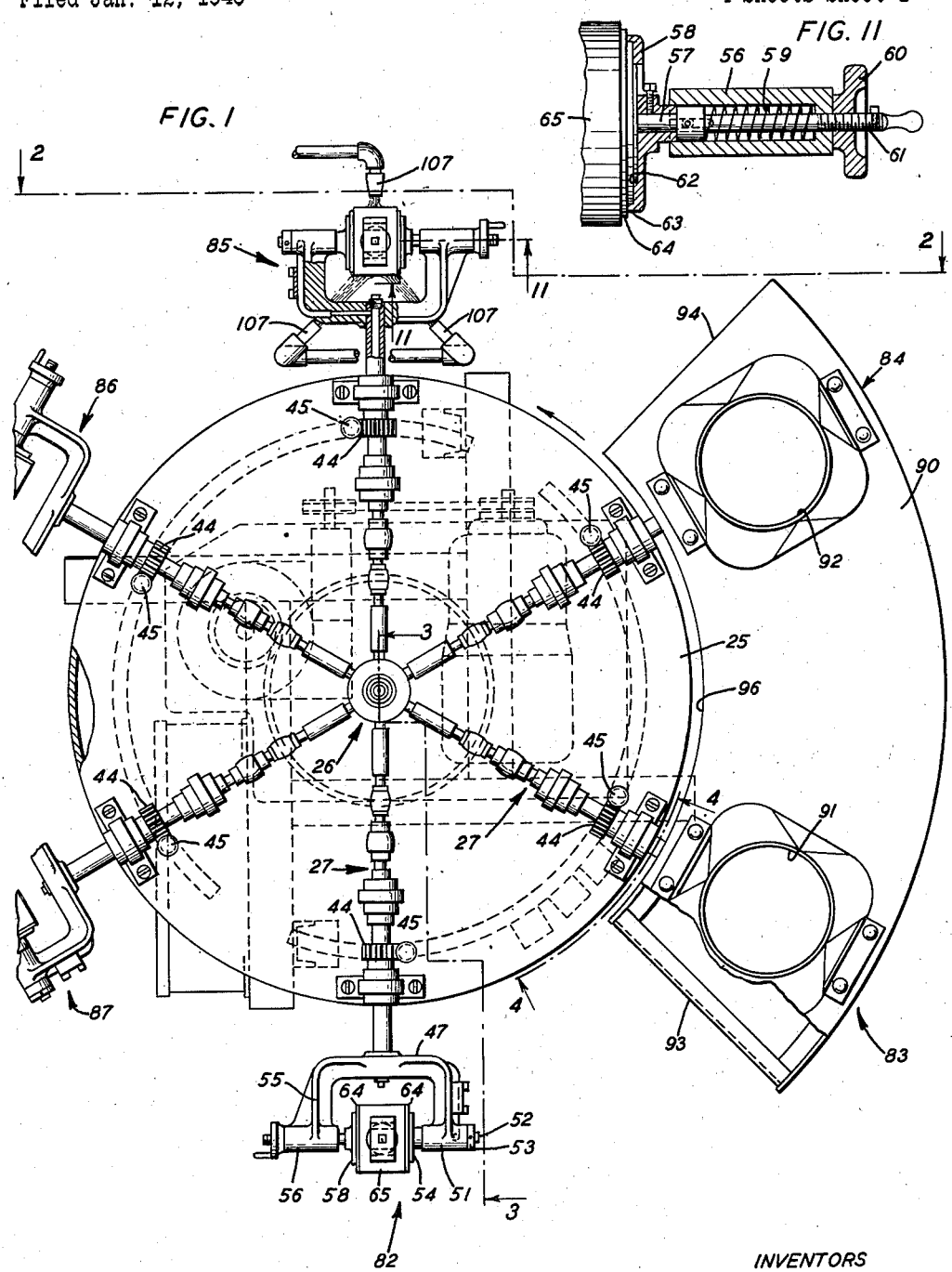

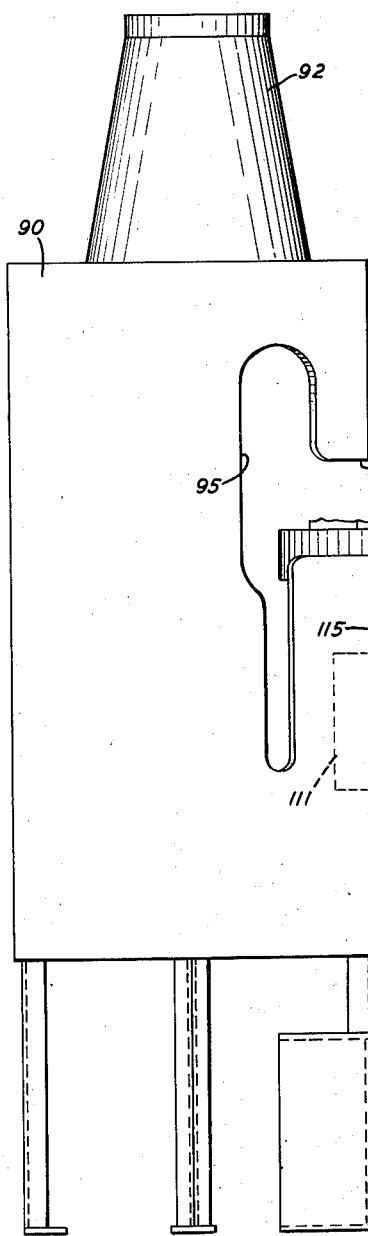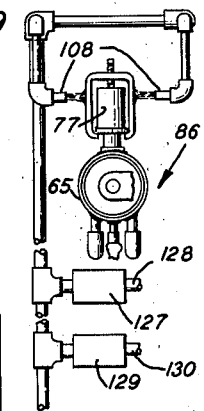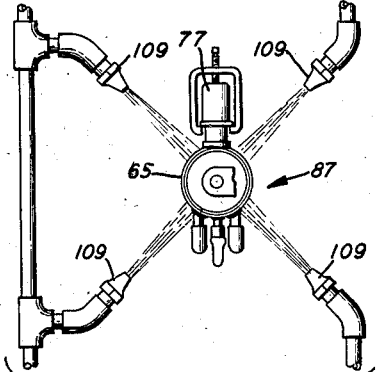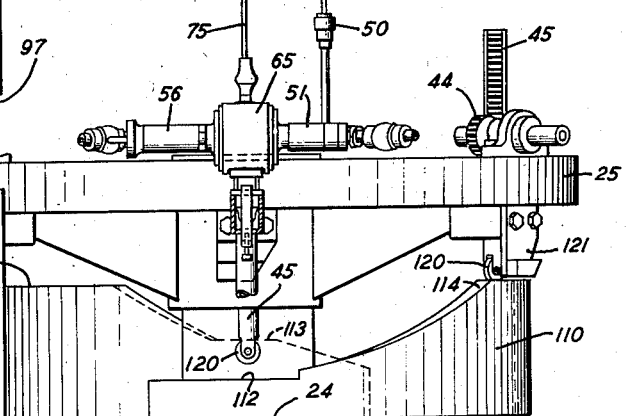

2,463,158

UNITED STATES PATENT OFFICE 2,463,158

APPARATUS FOR BRAZING ARTICLES

Alfred C. De Lorme, Maplewood, N. J., and Carl G. Schesch, New York, N. Y., assignors to Western Electric Company, Incorporated, New York, N. Y., a corporation of New York Application January 12, 1946, Serial No. 640,784

1 Claim. (Cl. 113—59)

This invention relates to apparatus for brazing articles, particularly those formed with metallic bodies having non-metallic elements, such as glass, sealed thereto.

In brazing articles composed entirely of like metals, the articles may be readily heated to the desired temperature for brazing, but when one or more of the articles has non-metallic elements, such as glass, previously sealed thereto, care must be taken to avoid damaging the elements, not only in heating the articles to the brazing temperature, but in cooling the articles and the elements to avoid breaking the elements.

An object of the invention is to provide an apparatus for brazing a metallic member to a metallic body without damaging a non-metallic element sealed on the body.

The apparatus includes a spider with radially projecting arms movable intermittently between a loading station, a preheating station, a hot heating station, a brazing station, an annealing station and a cooling station. The spider arms are hollow for the continuous circulation of a heavy gas, such as carbon dioxide gas, therethrough and through the hollow metallic bodies which are to be brazed to metallic cover plates. This gas drives air out of the hollow bodies and maintains them free of air internally during the complete cycle of operation of the apparatus to prevent oxidization of the inner surfaces of the bodies and members. The hollow bodies of the articles to be brazed, and their cover plates, are formed to receive a length of fusible material, such as silver solder, therebetween. During the operation of the apparatus non-metallic or glass elements, which have been previously sealed to the metallic body, are heated slowly with the metallic body and member at the preheating station. During the rest intervals between intermittent movement of the apparatus the temperature of both the metallic parts and the non-metallic elements are raised at the hot heating station after which the body and metallic members are heated to a brazing temperature at the brazing station to fuse the fusible material and cause internal brazing of the metallic members to the body. At another station heat is applied to the non-metallic elements to prevent rapid cooling thereof during the slow partial cooling of the body and metallic covers. Finally the metallic members and body are cooled by the application of air under pressure thereto.

With the exception of the initial assembly of the metallic body, the fusible material and the metallic covers in clamps at the ends of the spider arms and the removal of the completed article from the apparatus, operation of the apparatus is carried out automatically. This automatic control is associated with an electric motor drive, and brake therefor, to drive the spider between stations and to stop the assemblies a given length of time at each station, which time is controlled by variable timing units. The heating means at the annealing station is also under the automatic control of solenoid valves and variable timing units.

Other objects and advantages will be apparent from the following detailed description when considered in conjunction with the accompanying drawings, wherein Fig. 1 is a fragmentary top plan view of the apparatus;

Fig. 2 is a side elevational view of the apparatus taken along the line 2—2 of Fig. 1;

Fig. 3 is an enlarged fragmentary sectional view taken along the line 3—3 of Fig. 1;

Fig. 4 is an enlarged fragmentary sectional view taken along the line 4—4 of Fig. 1;

Fig. 5 is an enlarged fragmentary sectional view taken along the line 5—5 of Fig. 3;

Fig. 6 is a fragmentary sectional view of a portion of one of the metallic bodies and a metallic cover therefor after the brazing operation has been completed;

Fig. 7 is a fragmentary detailed view illustrating the heating means at the brazing station;

Fig. 8 is a fragmentary detailed view illustrating the heating means at the hot heating station;

Fig. 9 is a fragmentary detailed view illustrating the heating means at the annealing station;

Fig. 10 is a fragmentary detailed view of the air nozzles at the cooling station;

Fig. 11 is a fragmentary sectional view taken along the line 11—11 of Fig. 1; and Fig. 12 is a wiring diagram of the control system for the apparatus.

Referring now to the apparatus, a frame 15 supports a motor 16 and a speed reducing unit 17 operatively connected to the motor by a belt drive 18. A brake 19 is provided with a suitable mechanism (not shown) electrically operated in the conventional manner to apply a braking force to the motor shaft 20 immediately upon deenergization of the motor and to free the shaft 20 of the braking force immediately upon energization of the motor.

An output shaft 21 of the unit 17 has a pinion 22 mounted thereon which drives a gear 23 of a vertical shaft 24. The shaft 24 supports a table 25 and is fixed thereto so as to rotate therewith. The table 25 supports a spider 26 with radially extending arms 27.

The arms 27 are identical in structure and a description of the arm shown in Fig. 3 will apply to each of the other arms. The central portion of the spider includes a head 28 having a compartment or chamber 29 and an annular flange 30 secured to the table 25. A supply line 32, for carbon dioxide gas under low pressure above atmospheric pressure, is connected to a swing joint 33. The swing joint 33 is connected by a pipe 34 to the head 28 and the compartment 29 thereof. Threaded apertures 34 are formed in the head 28 at equally spaced positions for connections with their respective arms 27.

The arm 27 in Fig. 3 has a pipe connection 35 extending from its aperture 34 and is connected by a flexible hose 36 to another pipe connection 37. The next portion of the arm is a valve 38 to control the flow of the carbon dioxide gas through the arm. A swing joint 39 is connected to the valve 38 by a pipe connection 40 and to a hollow shaft 41 by a pipe connection 42. The hollow shaft 41 is rotatably supported in bearings 43 mounted upon the table 25. A pinion 44 is fixed to the hollow shaft 41 intermediate the bearings 43 and interengages a rack 45, the purpose of which will be described hereinafter.

A U-shaped clamp 47 is fixedly mounted upon the outer end of the shaft 41 and closes the outer end of the shaft. A leg 48 of the bracket 47 supports a tube 49, one end of which communicates with the interior of the hollow shaft 41, the other end supporting a ball valve socket 50. The arm 48 of the clamp 47 has a bearing portion 51 in which a shaft 52 is journalled with its axis at right angles to the hollow shaft 41. A collar 53 is pinned to the outer end of the shaft 52 and a clamping jaw 54 is fixed to the inner end of the shaft. The other arm 55 of the clamp 47 has a bearing portion 56 (Fig. 11) to receive a shaft 57 which supports a clamping head 58 on the inner end thereof. A fixed collar or enlarged integral portion 157 of the shaft 57 is held against rotation by a pin positioned to ride in an elongate aperture of the bearing. The shaft is forced to the left by spring 59, housed in the bearing portion 56 behind the collar 157. The clamping member 58 may be moved to the right by an internally threaded crank 60 mounted upon a threaded end 61 of the shaft 57. The member 58 is recessed at 62 forming an annular flange 63 to engage its respective cover member 64 of the article to be brazed. The clamping member 54 is substantially identical in structure with the clamping member 58 in that it is also provided with a recess and an annular flange such as those shown in Fig. 11.

In the present embodiment, the article to be brazed is commercially known as a magnetron tube. This tube comprises a hollow cylindrical body 65 of massive copper and flat disc shaped end members 64 of copper to be brazed on the open ends of the cylindrical body under a high degree of heat. The body 65 includes projections 66, 67, 68 and 69 of copper. Non-metallic elements such as bulbs 70, 71 and 72 formed of glass have previously been sealed to their respective projections 66, 67 and 68. A tube 73 is sealed to the projection 69. The tube 73 is open at this time and through it, and the projection 69, one end of a U-shaped tube 75 extends, the other end of the tube 75 being connected in the valve 50 to open the valve and thus open communication between the tubes 75 and 49.

In preparing each article for its travel through the apparatus, asbestos covers 76 (Fig. 3) are positioned on the glass bulbs 71 and 72 and a metal cover 77 is placed over the bulb 70 and secured in place by a clamp 78. A previous step should be considered at this time regarding the preparation of each article or magnetron tube for mounting in the apparatus. The body 65 has an annular groove 80 at each open end (Fig. 6) to receive a fusible material 81, such as silver solder. The adjacent cover 64 is formed to cooperate with the groove 80 in the body 65 to provide an annular cavity cylindrical in cross-section. This cavity is filled with the fusible material prior to the time the article is positioned between the clamping members 54 and 58. The flanges of the clamping members distribute the force of the spring 59 to firmly hold the covers 64 in place and to support the article firmly as it travels through the complete cycle of the apparatus.

There are six stations for the apparatus, the one at the bottom of Fig. 1 being the loading station 82. The table with the spider is rotated in a counterclockwise direction to successively advance the articles intermittently in this direction from the loading station, to a preheating station 83, a hot heating station 84, a brazing station 85, an annealing station 86 and a cooling station 87. An arcuate oven 90, having flues or exhaust ports 91 and 92 above the stations 83 and 84, houses these stations and the clamped articles disposed therein. The entrance and exit ends 93 and 94 of the oven have openings 95 therein, while the inner wall 96 has an opening 97 connecting the openings 95 for the travel of the clamps and their articles into, through and out of the oven.

At the preheating station within the oven 90, there are pairs of gas burners 99 and 100 positioned to direct flames toward the cover 77 for the element 70 and toward the metallic body and members. Supply lines 101 and 102 for the burners 99 and 100 continuously supply gas to the burners during the operation of the apparatus.

At the hot heating station 84, gas burners 103 direct flames toward the cover 77 for the element 70, while gas burners 104 and 105 direct flames to spaced portions of the metallic body and members. At the brazing station 85 gas burners 107, disposed at spaced positions, direct flames to the metallic body to bring it to a brazing temperature to melt the fusible material 81.

At the annealing station, gas burners 108 are positioned to direct flames to the cover 77 of the element 70 to control the cooling of the element 70 during the natural cooling of the metallic body and members in air at room temperature. At the cooling station 87, air nozzles 109 direct air under pressure to spaced positions of the metallic body and members to cool them to approximately room temperature so that the completed article may be removed from its clamp.

During the intermittent movement of the table and spider about their common axis, the positions of the clamps with the articles are controlled so that they will be in the correct positions to pass through the oven 90 and pass between the various burners at stations 83, 84 and 86, and between the air nozzles at station 87. This means includes arcuate cams 110 and 111 having low portions 112 and 113 respectively adjacent the loading station 82 and the brazing station 85.

The cam 110 has a high portion 114 adjacent the stations 83 and 84, while the cam 111 has a high portion 115 adjacent the stations 86 and 87. The racks 45 of each spider arm extends downwardly through bearing members 118 (Fig. 3) in its respective aperture 119 of the table 25 and supports a roller 120 on the lower end thereof positioned to ride on the cams 110 and 111.

Switch actuating cams 121 are adjustably mounted upon the table adjacent each spider arm (Fig. 4) to successively actuate toggle switches 122, 123 and 124. These switches are mounted upon a bracket 125 supported by the frame 15. The function of the toggle switch 124 is to cause deenergization of the motor 16 and operation of the motor brake 19 to stop the table and spider. The function of the toggle switch 122 is to operate a solenoid valve 127 (Figs. 9 and 12) for opening a gas supply line 128 to the burners 108, while the switch 123 causes energization of the solenoid valve 129 to open an air line 130 for the burners 108. A suitable pilot light may be employed to ignite the gas at the burners at this time, or the valves' valve 127 may be held partially open to accomplish this same purpose.

Attention is now directed to Fig. 12 which illustrates the control circuits for the apparatus. The motor 16 receives its electrical energy from supply lines 130 under the control of contacts 131 of a relay 132. Supply lines 133 and 134 are for the main control circuits and include a manually operable switch 135 for completing a circuit through the relay 132 when the toggle switch 124 is in its normal position. This circuit may be traced from the line 133 through switch 135, relay 132, contact 136 of toggle switch 124, through connection 137 to line 134.

Another switch 138, which is manually closed and remains closed during the operation of the apparatus connects timing units 139 and 140 in the control circuit to limit the time the motor 16 remains energized. These units may be of the commercially known types, the unit 139 being rendered effective upon movement of the toggle switch 124 by one of the cams 121 (Fig. 4), to direct electrical energy to the unit 140 after a given length of time, the unit 140 causing energization of the relay 132 after an additional length of time. The unit 139 includes a synchronous motor 141, with a solenoid release 142, to drive a contact arm 143 clockwise until it engages a variable contact 144. The circuit to the motor 141 is completed from line 133 through switch 135, connection 145, through a lower contact of switch 138, through motor 141, break contact 146 of relay 147, upper contact of switch 138, contact 148 of toggle switch 124 to connection 137 of line 134. Movement of the toggle switch 124 from contact 136 to contact 148 deenergizes a relay 132 to open the circuit to the motor and stop rotation of the table and spider. The time the table and spider remains stopped is controlled by the units 139 and 140. In the present instance, the variable contact 144 is set to be engaged by the movable contact 143 twelve minutes after the toggle switch 124 has been moved to the contact 148. When the circuit is closed between the contacts 143 and 144, the relay 147 is energized opening contact 146 and closing contacts 150 and 151. By opening contact 146, the motor 141 is deenergized. Closing of contact 151 completes a locking circuit for the relay 147 and closing of contact 150 completes a circuit through an indicating lamp 152 and also through the timing unit 140. The timing unit 140 includes a slow acting relay 153 to close its contact 154 after a given length of time, such as 30 seconds. The purpose of two timing units with an intermediate signal 152 is to warn the operator a suitable length of time prior to the next intermittent movement of the table and spider.

The toggle switches 122 and 123 (Figs. 4 and 12) render timing units 158 and 159 respectively to cause energization of their respective solenoid valves 127 and 129 to simultaneously open the gas line 128 and the air line 130 for the burners 108 at the annealing station. The timing unit 158 in the present instance is set for thirteen minutes and two seconds while the timing unit 159 is set for only thirteen minutes. The reason for the difference in time being to avoid blowing out the flames at the burners 108 by turning off the air prior to the closing or partial closing of the gas valve.

Upon closing the toggle switch 122, a circuit is completed from line 133 at connection 162 through switch 122, break contact 163 of a relay 164, through a relay 165 to line 134 at connection 166. Energization of the relay 165 completes a circuit for the winding of the solenoid valve 127 from connection 162 through a make contact 167 of relay 165, through the winding of the solenoid valve 127 to line 134 at connection 166. At the same time, make contact 168 of relay 165 completes a locking circuit for the relay under the control of a break contact 169 of relay 164. This circuit may be traced from line 133 at connection 162, through contact 169, closed contact 168, relay 165 to line 134 at connection 166. The closing of contact 167 completes a circuit through the synchronous motor 170 which drives a contact pointer 171 toward a variable contact 172. When the pointer 171 engages the contact 172, a circuit is completed through the relay 164, from line 133 at connection 162, through contact 172, pointer 171, relay 164 to line 134 at connection 166. Energization of the relay 164 breaks contacts 163 and 169 makes contact 174. The closed contact 174 completes a locking circuit through the relay 164 until the timing unit is reset to its normal position. The breaking of contacts 163 and 169 opens the initial and locking circuits through the relay 165 causing deenergization thereof. As a result, the solenoid valve 127 is deenergized and allowed to move to its normal or closed or partially closed position.

In view of the fact that the timing unit 159 is identical with the timing unit 158, like reference numerals are applied to the respective parts of both units and it is believed that a duplication of description is unnecessary.

Upon considering the operation of the apparatus, let it be assumed that one of the articles with its metallic body 65 and cover members 64, together with the intermediate fusible members 81, are firmly held between the clamping members 54 and 58 in the clamp 47 at the loading station 82 (Fig. 1). When this has been accomplished, one of the tubes 75 is mounted in place with one end extending through the members 69 and 73 and into the body 65, the tube 75 being smaller in diameter than the members through which this particular end extends to allow for the escapement of air from the article. The other end of the tube 75 is connected with its respective ball valve 50, this connection opening the valve to allow for the passage of carbon dioxide gas from the supply line 32 (Fig. 3) through the chamber 29 and through various hollow parts of the respective spider arm 27, past the valve 50 and through the tube 75 into the article. Carbon dioxide gas being heavier than air, it is important that the article be inverted at the loading position for a given length of time to allow filling the article with the gas and the forcing of the air thereby out of the article. The continued forcing of the carbon dioxide gas under a low pressure into the article during its travel through the apparatus keeps air from entering the article and thus eliminates oxidization of the inner surfaces of the body and members during the various heating steps and the final cooling step.

When the initial article is loaded in the apparatus, the switch 135 (Fig. 11) is closed and if the switch 138 is closed, the apparatus is set in motion. It is preferred that the operator close the switches prior to the loading of the initial article so that the timing unit 139 may start to function. The lamp 152, with additional lamps, if desired, disposed at inverted positions will warn the operator 30 seconds before the table and spider begin their intermittent movement. At each rest period of the apparatus, a completed article is removed from the clamp at the loading position and the parts for a new article are loaded in the clamp.

As the clamp with the assembled parts of the article leaves the loading position, the roller 120 of the rack 45, associated with this particular clamp, rides on the cam 110 forcing the rack upwardly to rotate the pinion 44 and the hollow shaft 41 to invert the clamp and article so that the article will be in the proper position to enter the opening 95 in the entrance end of the oven 90. The article will also be in a position with the element 70 and its cover 77 between the burners 99 and the metallic body and cover members between the burners 100 at the preheating station. The article and clamp remain in this position controlled by the cam 110 as they travel to the hot heating station 84. The term "hot heating" is used to distinguish between preheating and brazing heating. At the hot heating station, the temperature of the metallic, as well as the non-metallic parts, are raised above their temperatures at the preheating station, but below the temperature required for brazing. After the article reaches the hot heating station 84, the adjacent cam roller 120 leaves the cam 110 so that at the brazing station, the article and its clamp may be rotated by the operator to position portions of the body and cover members so that external brazing may be performed at the junctures of the body and members. The clamp with the article may be rotated 180° from the positions they are in when leaving the oven 90. During this rotary movement the shaft 41 is rotated in its bearing 43 and the rack 45 is moved up or down accordingly. If the article should remain inverted upon leaving the brazing station 85, the cam roller 120 will ride upon the cam 111 to move its rack 45 upwardly to again rotate the shaft 41, the clamp 47 and its article so that the element 70 and its cover 77 may be positioned between the burners 108 at the annealing station 86. The clamp and the article are held in this position by the cam 111 while at both the annealing and the cooling stations. The application of heat to the element 70 and its cover 77 prevents the element from cooling too rapidly during the normal cooling of the metallic parts of the article. At the cooling station, the jets of air are directed to the article to cool it so that it may be readily removed from its clamp when it reaches the loading station 82.

This operation may continue with one loading station and five processing stations. During the brazing of one article, two other articles are being prepared for brazing and three previously brazed articles are respectively annealed, cooled and positioned to be removed from the apparatus. With the apparatus operating intermittently, allowing sufficient time at each station for the different functions required, considerable time is saved as the operator, if working upon one article at a time, must wait until the metallic parts are heated sufficiently to perform the brazing operation. Furthermore, the presence of non-metallic or glass elements requires special care in heating and cooling the articles to avoid breaking the elements. With the accurate timing in the control mechanism, the operator is relieved of this problem. During each intermittent movement of the apparatus, the cam 121, adjacent the arm of the spider entering the oven 90, operates the switches 122, 123 and 124 (Fig. 4) in succession to respectively open the gas and air valves 127 and 129 at the annealing station and to stop the motor 16 by opening its control contacts 131 and energize the magnetic brake 19 to stop the shaft 20.

Although specific improvements of the invention have been shown and described, it will be understood that they are but illustrative and that various modifications may be made therein without departing from the scope and spirit of this invention as defined by the appended claims.

What is claimed is:

An apparatus for brazing articles assembled of metallic members and hollow metallic bodies having elements, formed of non-metallic materials such as glass, sealed thereon, and fusible materials interposed between the bodies and members, the apparatus comprising a hollow spider rotatable about its axis and having radially extending arms, clamps carried by the arms to grip and support the articles, a heating station, a brazing station and a cooling station disposed at spaced positions about the spider, energizable means to move the spider intermittently to advance the articles successively to the stations to cause them to be preheated, heated to a brazing temperature to melt the fusible materials and then cooled, means to render the moving means deenergized during variable time intervals between intermittent movements of the spider, means to direct a gas heavier than air into the spider, and means connecting the spider arms with the hollow bodies of the articles to direct the gas into the bodies to force air therefrom.

ALFRED C. DE LORME.
CARL G. SCHESCH.

REFERENCES CITED

The following references are of record in the file of this patent:

UNITED STATES PATENTS

| Number | Name | Date |
| --- | --- | --- |
| 941,147 | Holloway | Nov. 23, 1909 |
| 1,478,696 | Boehme | Dec. 25, 1923 |
| 2,038,525 | Cate | Apr. 28, 1936 |
| 2,082,080 | Palucki | June 1, 1937 |
| 2,152,812 | Money | Apr. 4, 1939 |
| 2,394,467 | Muller | Feb. 5, 1946 |
| 2,401,930 | Hansen | June 11, 1946 |